(12) United States Patent
Kim et al.

(10) Patent No.: US 7,345,690 B2
(45) Date of Patent: Mar. 18, 2008

(54) DISPLAY SYSTEM FOR ADJUSTING VIDEO PARAMETERS FOR USER-SELECTED AREA

(75) Inventors: Byung Han Kim, Gumee-shi (KR); Hong Ki Kim, Taegu (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/355,050

(22) Filed: Jan. 31, 2003

(65) Prior Publication Data
US 2004/0150648 A1   Aug. 5, 2004

(51) Int. Cl.
*G09G 5/00* (2006.01)
(52) U.S. Cl. .......................... 345/581; 345/20; 345/77; 345/204; 345/560; 345/619; 345/690; 348/432.1; 348/434.1; 348/461; 382/287; 715/722
(58) Field of Classification Search ................ 345/581, 345/589, 14, 156, 560; 348/565, 553–570, 348/177–180, 441, 446, 432.1, 434.1, 463; 715/722
See application file for complete search history.

(56) References Cited

U.S. PATENT DOCUMENTS

| | | | |
|---|---|---|---|
| 5,550,556 A * | 8/1996 | Wu et al. ...................... | 345/14 |
| 6,226,040 B1 * | 5/2001 | Kuo et al. .................... | 348/446 |
| 6,333,762 B1 * | 12/2001 | Yoo et al. .................... | 348/441 |
| 6,606,100 B1 * | 8/2003 | Lonoce et al. ............... | 345/698 |
| 6,784,943 B1 * | 8/2004 | Tults .......................... | 348/465 |
| 6,999,092 B2 * | 2/2006 | Hagiwara .................... | 345/581 |
| 2002/0109669 A1 * | 8/2002 | Ha .............................. | 345/156 |

FOREIGN PATENT DOCUMENTS

| | | |
|---|---|---|
| JP | 01-188896 | 7/1989 |
| JP | 10-326091 | 12/1998 |
| JP | 11-327519 | 11/1999 |
| JP | 2002-149142 | 5/2002 |
| WO | 01/41117 | 6/2001 |
| WO | WO 01/41117 A1 | 6/2001 |

* cited by examiner

*Primary Examiner*—Kee M. Tung
*Assistant Examiner*—Antonio A Caschera
(74) *Attorney, Agent, or Firm*—Lowe Hauptman Ham & Berner LLP

(57) ABSTRACT

A display system for adjusting video parameters of a user-selected area is disclosed. The display system includes a level detector detecting a line pattern included in one of a plurality of image lines representative of a complete image being displayed, and a pattern receiver coupled to the level detector for receiving the detected pattern, where the received pattern includes a position indicator whose ends are vertically aligned with vertical edges of the user-selected area. In addition, the display system further includes a pixel counter coupled to the pattern receiver for measuring a set of horizontal positions of the indicator ends with respect to a reference point, a pattern analyzer calculating a set of horizontal positions of vertical edges of a video control area on the basis of the positions of the indicator ends, and a video preamplifier adjusting at least one of video parameters of the video control area.

21 Claims, 6 Drawing Sheets

DISPLAY SYSTEM FOR ADJUSTING VIDEO PARAMETERS FOR USER-SELECTED AREA

BACKGROUND OF THE INVENTION

1. Field of the Invention

The present invention relates to a display device, and more particularly, to a display system that is able to adjust one or more video parameters of a user-selected area on a monitor screen.

2. Discussion of the Related Art

Typical computer-related display systems use a Cathode Ray Tube (CRT) monitor for displaying various types of data including video and text. For displaying video data such as motion pictures, graphics, and photographs on the CRT monitor, a reasonably high level of luminosity is often required because far more colors are used to provide realistic shading and variation in color. The increase in the luminosity range of the vide data on the CRT monitor makes the video image richer in contrast and brightness, improving the perceptual quality of the image.

However, compared to TV systems, the existing computer-related display systems such as CRT monitors or LCD displays usually do not provide enough luminosity when displaying the video data mentioned above. For example, when a video signal for an ordinary TV system (e.g., a broadcasting video signal or any other signal for display on a TV screen) is displayed on an ordinary CRT monitors, the brightness of the displayed image is typically too low and the image is too dark and shadowy. This is because the brightness parameters of the existing computer-related display systems are usually much less than those of the TV systems.

In order to obviate this problem, it would be highly desirable to have a display system that is able to increase the luminosity level of a user-selected area of a CRT monitor screen while retaining the luminosity of the all other areas at a relatively lower level. In this way, the perceptual image-quality of the user-selected area can be greatly improved without increasing the brightness of the entire monitor screen, providing a desirable solution to the above-mentioned problem.

SUMMARY OF THE INVENTION

Accordingly, the present invention is directed to a display system for adjusting video parameters of a user-selected area that substantially obviates one or more problems due to limitations and disadvantages of the related art.

An object of the present invention is to provide a display system for adjusting video parameters of a user-selected area that compensates delays that occur between a video signal and horizontal sync signals that the display system receives from an image-source device.

Another object of the present invention is to provide a display system for adjusting video parameters of a user-selected area that compensates a vertical offset due to different display settings between the display system and an image-source device.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages, a display system for adjusting video parameters of a user-selected area according to the present invention includes a level detector detecting a line pattern included in one of a plurality of image lines representative of a complete image being displayed; a pattern receiver coupled to the level detector for receiving the detected pattern that includes a position indicator whose ends are vertically aligned with vertical edges of the area; and a pixel counter coupled to the pattern receiver for measuring a first set of horizontal positions of the indicator ends with respect to a reference point, which is a first starting pixel of a topmost image line of the complete image. The display system further includes a pattern analyzer calculating a second set of horizontal positions of vertical edges of a video control area with respect to the reference point on the basis of the first set of horizontal positions; and a video preamplifier adjusting at least one of video parameters of the video control area in accordance with a prescribed set of video parameter values included in the received pattern.

In addition, the display system according to the present invention further includes a line counter coupled to the pattern receiver for measuring a vertical offset distance between the reference point and the pattern-included line, where the pattern further includes a first set of vertical positions of horizontal edges of the user-selected area with respect to the pattern-included line. Then, the pattern analyzer further calculates a second set of vertical positions of horizontal edges of the control area with respect to the reference point by adding the offset distance to the first set of vertical positions, respectively.

In another aspect of the present invention, a display system for adjusting video parameters of a user-selected area includes a level detector detecting a line pattern included in one of a plurality of image lines representative of a complete image being displayed; a pattern receiver coupled to the level detector for receiving the detected pattern that includes a position indicator whose ends are vertically aligned with vertical edges of the area; and a pixel counter coupled to the pattern receiver for measuring a first set of horizontal positions of the ends with respect to a reference point, which is a first starting pixel of a topmost image line of the complete image. The display system further includes a monitor microprocessor coupled to the pattern receiver for calculating a second set of horizontal positions of vertical edges of a video control area with respect to the reference point on the basis of the first set of horizontal positions, the microprocessor inputting pixel frequency information to the pixel counter; and a video preamplifier adjusting at least one of video parameters of the video control area.

In addition, the display system further includes a line counter coupled to the pattern receiver for measuring a vertical offset distance between the reference point and the pattern-included line, where the pattern further includes a first set of vertical positions of horizontal edges of the user-selected area with respect to the pattern-included line. Then, the monitor microprocessor further calculates a second set of vertical positions of horizontal edges of the control area with respect to the reference point by adding the offset distance to the first set of vertical positions, respectively.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
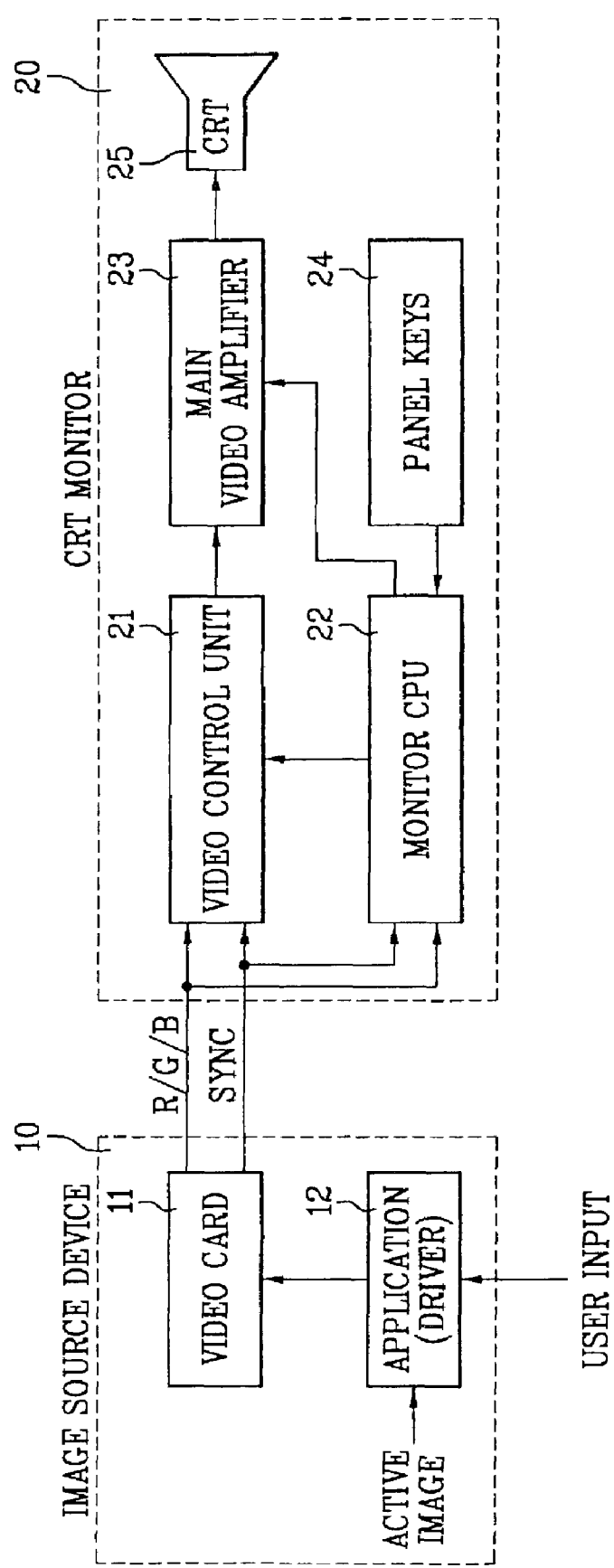
FIG. 1 illustrates an image display system according to the present invention.

FIG. 1 illustrates an image display system according to the present invention. Referring to FIG. 1, the image display system includes an image source device 10 (e.g., a computer device) that generates a video signal (an R/G/B signal) and horizontal and vertical sync signals (H-SYNC and V-SYNC), and a Cathode Ray Tube (CRT) monitor 20 that receives the R/G/B signal and SYNC signals from the image source device 10 and displays an image in response to the received R/G/B and SYNC signals. The image source device 10 includes an application unit (e.g., an installed program or driver unit) 12 that receives information representing an original image (active image) and adds a line pattern to the topmost image line of the active image, and a video card 11 that receives the video information representing the pattern-added active image and generates a video signal and corresponding H-SYNC and V-SYNC. The line pattern includes the location of a user-selected area with respect to a reference point $P_o'$ on the active image.

On the other hand, the CRT monitor 20 includes panel keys 24, a monitor CPU (e.g., a microprocessor) 22, a video control unit 21, a main video amplifier 23, and a CRT 25. The video control unit 21 initially receives the R/G/B signal and SYNC signals from the video card 11, and it adjusts video parameters including brightness, contrast, sharpness and emphasis of the user-selected area upon determining the location of a video control area with respect to a reference point $P_o''$ on a complete image being actually displayed on the CRT 25. The video control unit 21 receives pixel frequency information from the monitor CPU 22 so as to properly measure the horizontal distances (number of pixels) of the left and right edges of the user-selected area with respect to $P_o''$. Lastly, the panel keys 24 receive a command from a user for controlling display settings of the CRT monitor 20, and the main video amplifier 23 amplifies the RGB signal processed in the video control unit 21. Then the CRT 25 displays the amplified signals.

Figure 2:
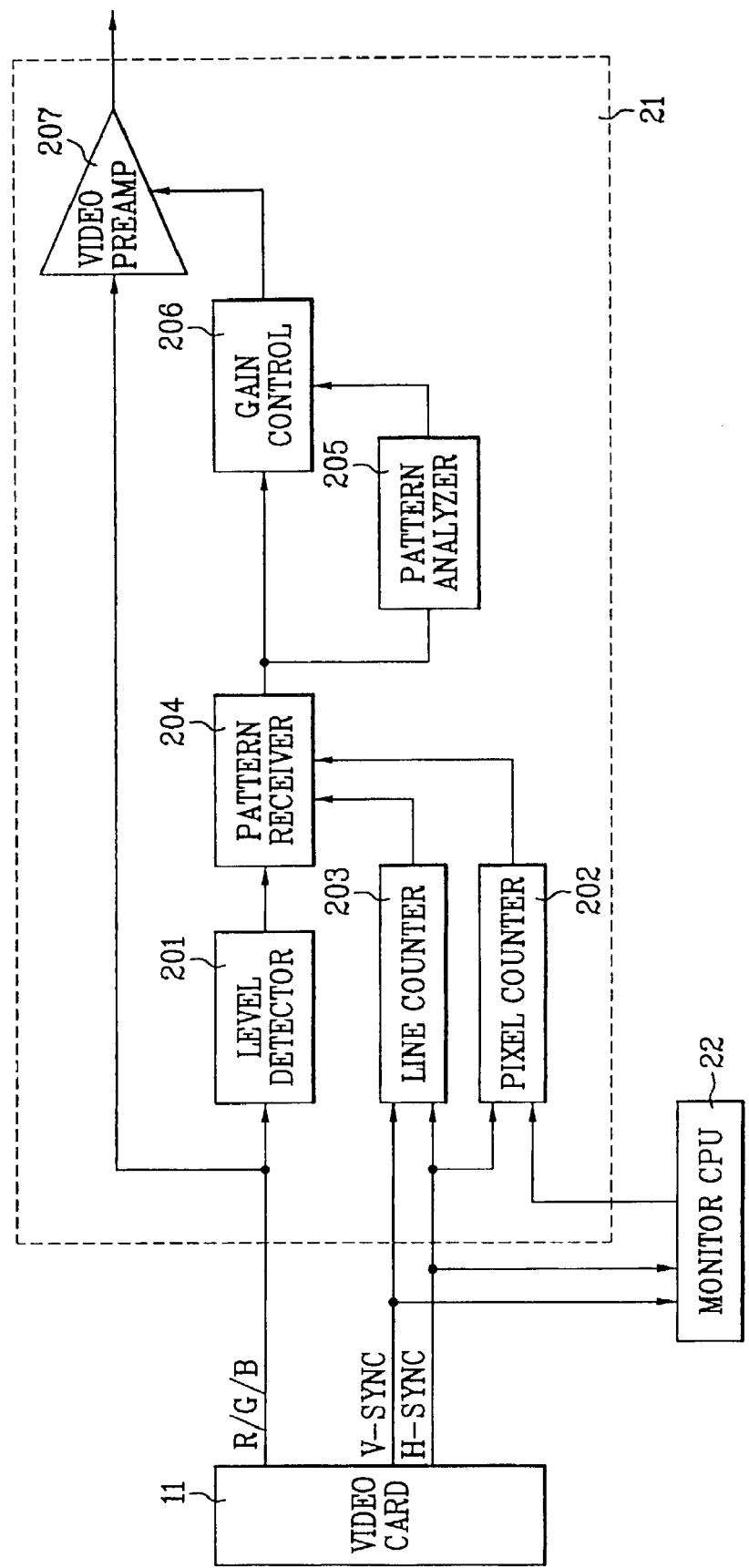
FIG. 2 illustrates a first embodiment of the video control unit shown in FIG. 1 according to the present invention.
Figure 3:
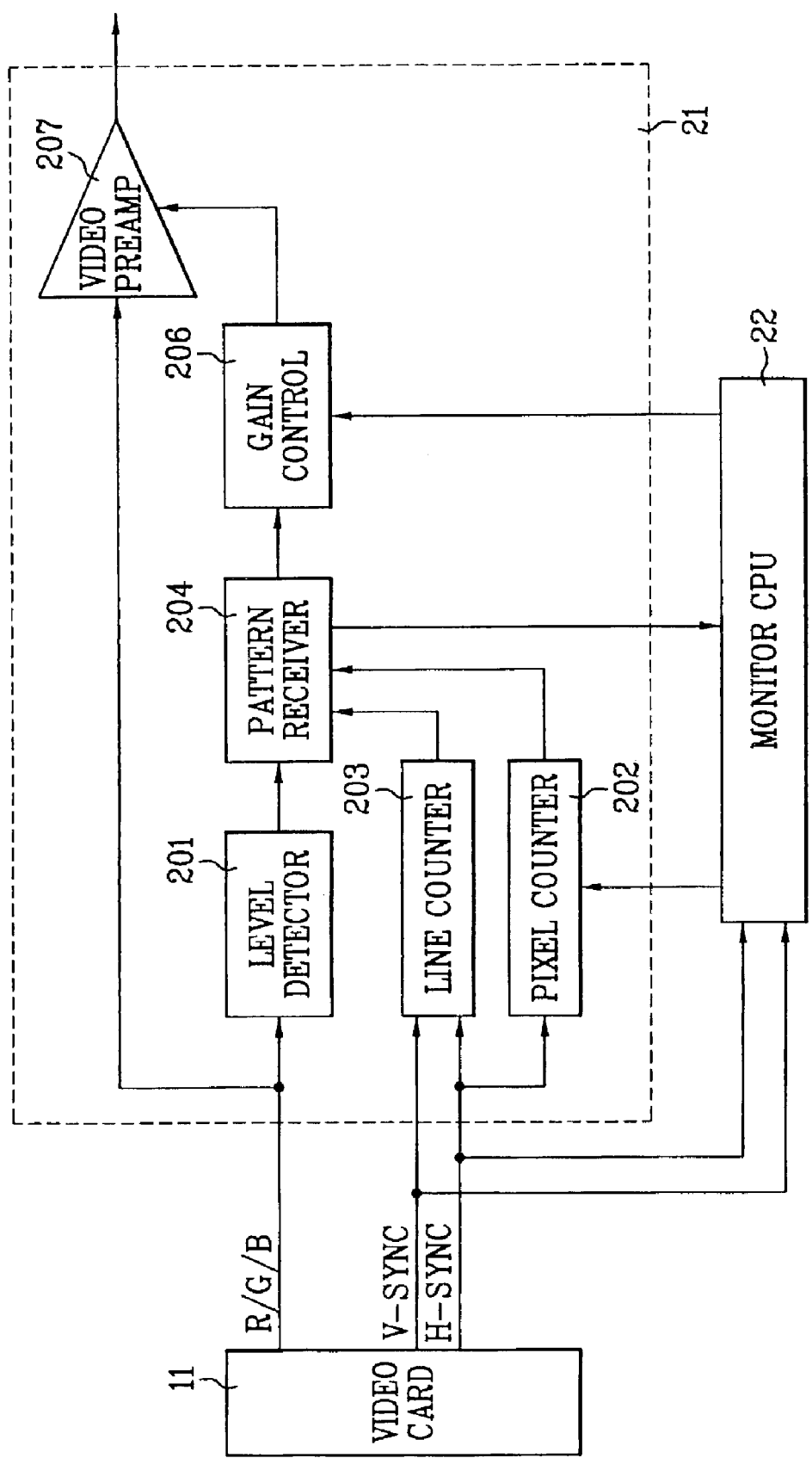
FIG. 3 illustrates a second embodiment of the video control unit shown in FIG. 1 according to the present invention.
Figure 5:
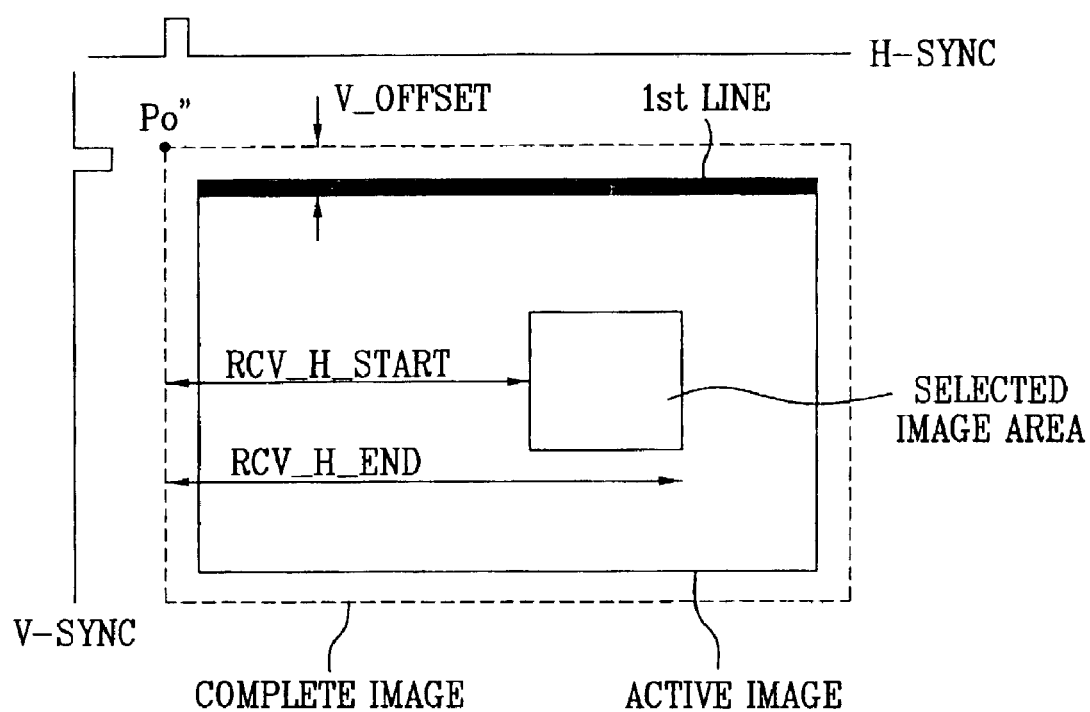
FIG. 5 illustrates an example of a complete image being displayed on a CRT in response to a video signal and SYNC signals that a video card generates.

FIG. 2 and FIG. 3 illustrate first and second embodiments of the video control unit 21 included in the CRT monitor 20 shown in FIG. 1. Referring to FIG. 2, the video control unit 21 includes a level detector 201 detecting a line pattern included in one of a plurality of image lines representative of a complete image being displayed on the CRT 20 as shown in FIG. 5, and a pattern receiver 204 coupled to the level detector 201 for receiving the detected line pattern. The received line pattern includes a position indicator whose ends are vertically aligned with vertical edges of the user-selected area and includes data indicating a set of vertical positions of the horizontal edges of the user-selected area with respect to the pattern-included line. The video control unit 21 further includes a pixel counter 202 coupled to the pattern receiver 204 for measuring a set of horizontal positions of the indicator ends with respect to a reference point, which is a first staring pixel of the topmost line of the complete image, and a line counter 203 coupled to the pattern receiver 204 for measuring a vertical offset distance between the reference point and the pattern-included line. Then, the pattern analyzer 205 calculates a set of horizontal positions of the vertical edges of a video control area with respect to the reference point on the basis of the horizontal positions of the indicator ends, and it further calculates a set of vertical positions of horizontal edges of the control area with respect to the reference point by adding the offset distance to the vertical positions included in the pattern. Lastly, the video control unit 21 includes a gain controller 206 that sets the video control gains for the control area according to a prescribed set of video parameter values included in the line pattern, and a video preamplifier 207 that amplifies the RGB signal accordingly.

The video control unit 21 shown in FIG. 3 is identical with the video control unit 21 shown in FIG. 2 except that the pattern analyzer 205 is omitted. Instead, the monitor CPU 22 calculates the positions of the control area with respect to the reference point in a similar manner, and the gain controller 206 sets the video control gains for the control area. In this way, the structure of the video control unit 21 is greatly simplified.

Figure 4:
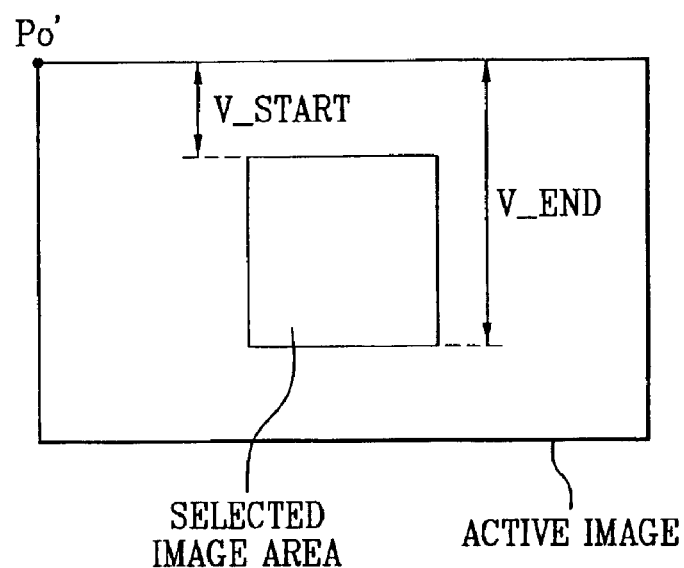
FIG. 4 illustrates an example of an original (active) image represented by image information that a PC application generates to a video card.

FIG. 4 illustrates an example of an active image represented by image information that the application unit 12 provides to the video card 11 shown in FIG. 1. The application unit 12 of the image source device 10 allows a user to select a desired area (a rectangular box shown in FIG. 4) and adjust one or more video parameters of the selected area. The desired area can be selected by, for example, clicking the upper left corner of a desired area with a mouse pointer controlled by a mouse (not illustrated) connected to the image source device 10 and dragging the pointer to the lower right corner of the desired area. Alternatively, the desired area can be simply selected by clicking at least one of windows being currently displayed on the monitor screen or by pressing one or more key buttons provided on a keyboard (not illustrated).

When the user selects a desired area, the application unit 12 measures and stores the position information of the selected area. The information includes V_START and V_END, which represent the vertical positions of the upper and lower edges of the user-selected area with respect to a reference point (e.g., $P_o'$ shown in FIG. 4) of the active image. The application unit 12 may further measures H_START and H_END, which represent the horizontal positions of the left and right edges of the selected area with respect to $P_o'$, but these values are not necessarily required for adjusting video parameters of the user-selected area in accordance with the present invention. The values of the vertical positions that are stored by the application unit 12 are in lines while the horizontal positions are in pixels. This is because the application unit 12 uses a coordinate system, in which the vertical and horizontal positions of any point on the active image are in lines and pixels, respectively.

After the application unit 12 obtains the required coordinate information, then it adds a line pattern to the topmost line of the active image. The line pattern includes pattern data that includes coordinate information of the user-selected area (V_START and V_END), a control code, and a pattern-verification code (e.g., checksum). The line pattern may further include the horizontal positions of the user-selected area with respect to $P_o'$. The control code is a code that includes video control parameters for brightness, contrast, sharpness, emphasis and many others. The application unit 12 ensures proper transmission of the pattern data by including a data-verification code such as a checksum that allows the video control unit 21 or the monitor CPU 22 to verify that the transmitted pattern data has not changed during the transmission and to prevent from detecting any non-pattern portion of a video signal as pattern data. Typically, a checksum is a number that represents the summation of representative values of all the text in the transmitted pattern data that both the application unit 12 and the monitor CPU 22 (or video control unit 21) are able to determine. The monitor CPU 22 can verify the pattern data included in the line pattern by comparing the checksum included in the pattern data to a checksum that it newly determines.

Referring back to FIG. 1, after the video card 11 of the image source device 100 receives image information that defines the pattern-added active image from the application unit 12, the video card 11 generates a RGB signal and horizontal and vertical sync signals (H_SYNC and V_SYNC) to display an image and control the operation of the CRT monitor 20. Then the video control unit 21 of the CRT monitor 20 receives the RGB and SYNC signals and adjusts at least one of the brightness, contrast, sharpness, and emphasis parameters for a user-selected area according to a prescribed set of parameter values of the control code. Thereafter, the pre-amplified RGB signal is sent to the main video amplifier 23 that amplifies the RGB signal, and the CRT 25 displays the RGB signal.

FIG. 5 illustrates an example of a complete image that the CRT 25 displays in response to the RGB signal and SYNC signals received from the video card 11. Referring to FIG. 5, it should be noted that the complete image being actually displayed on the CRT 25 does not exactly coincide with the active image shown in FIGS. 4 and 5, but it is rather a full image being larger than the active image due to different display settings or coordinate systems between the CRT monitor 20 and the application unit 12. For example, the coordinate system used for representing the position of a point on the complete image shown in FIG. 5 may be different from that of the active image shown in FIG. 4. In other words, the position of any point on the complete image is measured with respect to a reference point on the complete image (e.g., $P_o''$) instead of a reference point on the active image ($P_o'$). In addition, delays often occur between the RGB signal and SYNC signals that the CRT monitor 20 receives from the video card 11. These delays generate even greater coordinate inconsistency between the complete image and the active image.

Figure 6:
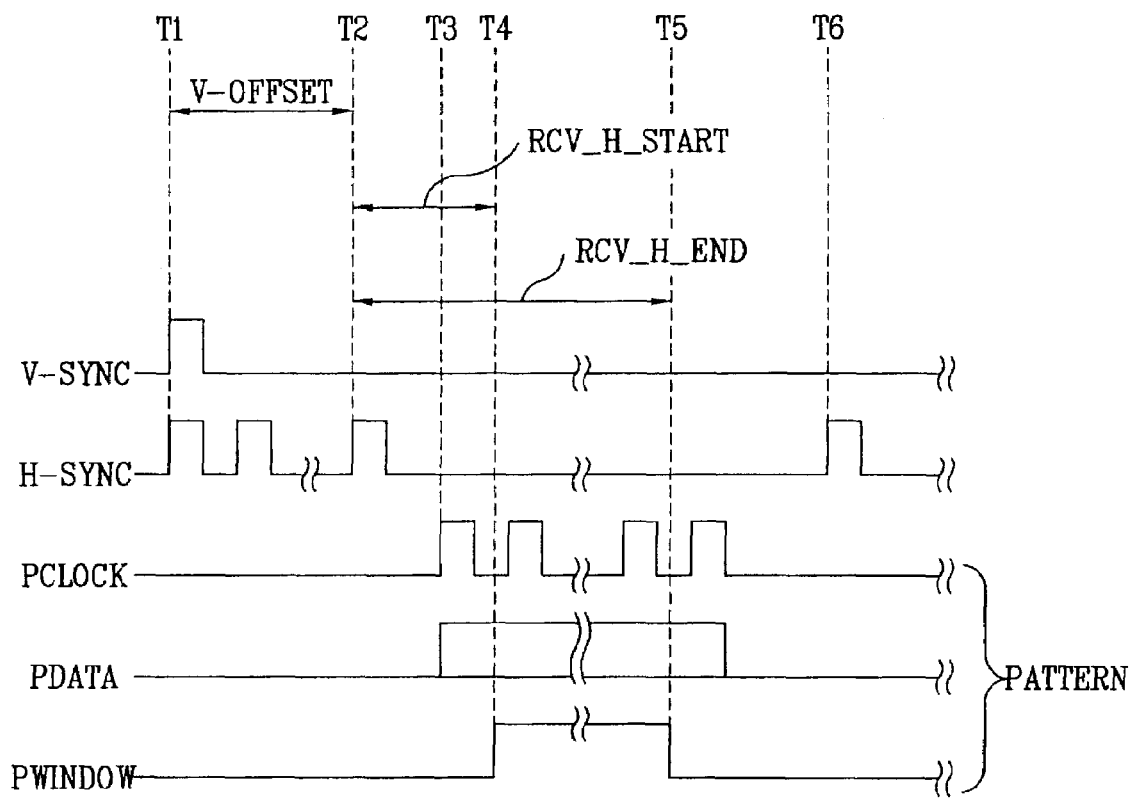
FIG. 6 illustrates SYNC signals and signals for a line pattern.

FIG. 6 illustrates V-SYNC, H-SYNC, and the signals for a line pattern that the video control unit 21 receives from the video card 11. As explained earlier, the video signal corresponding to the topmost line of the active image includes a pattern signal. The pattern signal includes PCLOCK, PDATA and PWINDOW signals, each of which can be included in the RGB signals, respectively. More details regarding FIG. 5 and FIG. 6 are further described below.

Reference will now be made in detail to operation of the image display system according to the present invention, which is illustrates in FIGS. 1-3. At the beginning, the video preamplifier 207 and the level detector 201 start receiving a RGB signal and H-SYNC and V-SYNC from the video card 11 of the image source device 10. Referring back to FIG. 6, the line counter 203 initially detects a first V-SYNC pulse and a first H-SYNC pulse at time=T1. The detected sync pulses represent the beginning point ($P_o''$) of the topmost video line of the complete image shown in FIG. 5. Between T1 and T2, the line counter 203 of the video control unit 21 keeps counting the number of video lines of the complete image by detecting further H-SYNC pulses until T2.

At time=T2, the line counter detects a H-SYNC pulse that correspond to the beginning point of a video line of the complete image that includes the line pattern. Thereafter, the pattern receiver 204 of the video control unit 21 detects a first rising edge of the PCLOCK signal at time=T3. At this time, the pattern receiver 204 determines V-OFFSET which represents the number of the video lines detected by the line counter 203 between T1 and T2. In other words, V_OFFSET represents the vertical distance between the topmost line of the complete image and the pattern-included image line as shown in FIG. 5.

In addition, the pattern receiver 204 extracts the pattern data from a PDATA signal that it receives from the level detector 201. The PDATA signal is a signal that includes "0" or "1" according to the pattern data included therein as shown in FIG. 6. As mentioned earlier, the extracted pattern data includes V_START, V_END, a control code, and a checksum. V_START and V_END represent the vertical positions of the upper and lower edges of the user-selected area with respect to a reference point of the active image (e.g., $P_o'$ shown in FIG. 4). The control code is a code that includes brightness for highlighting the user-selected area and other type of video parameters such as contrast, sharpness, and emphasis. The checksum is a pattern-verification code that allows the pattern receiver 204 or the monitor CPU 22 to verify the received pattern data.

The pattern signal that pattern receiver 204 receives from the level detector 201 further includes a PWINDOW signal that indicates the horizontal positions of the user-selected area with respect to $P_o''$ as shown in FIG. 5. Referring back to FIG. 6, the pattern receiver 204 detects the rising edge of the PWINDOW signal at time=T4. Next, the pattern receiver 204 determines RCV_H_START, which represents the horizontal position of the left edge of the user-selected area shown in FIG. 5 with respect to $P_o''$, using the pixel counter 202 that counts the number of pixels that exist between T2 and T4. The pixel counter 202 uses pixel frequency information provided by the monitor CPU 22 in order to count each pixel. Thereafter, the pattern receiver 204 detects the falling edge of the PWINDOW signal at time=T5. Similarly, the pattern receiver uses the pixel counter 202 to determine RCV_H END, which represents the horizontal position of the right edge of the user-selected area shown in FIG. 5 with respect to $P_o$". Again, the pixel counter 202 counts the number of pixels that exist between T2 and T5.

Figure 7:
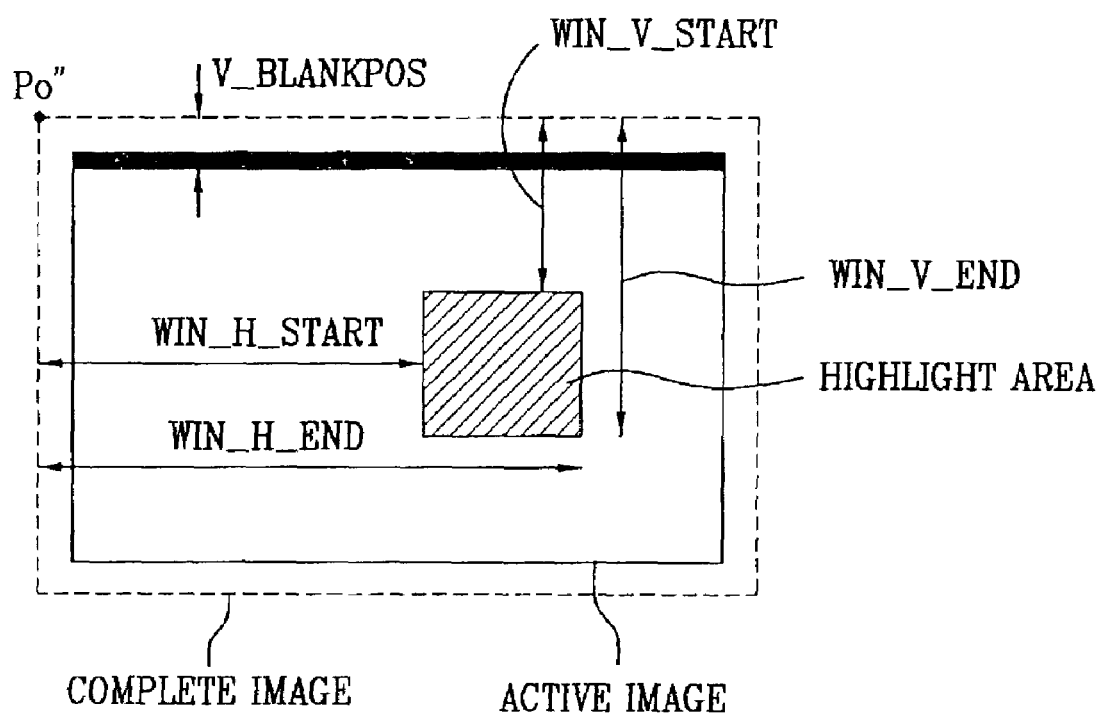
FIG. 7 illustrates graphical representation of the position of a video control area.

After all of V_OFFSET, RCV_H_START, RCV_H_END are determined and the pattern data is received completely, the pattern receiver 204 sends the determined positions values to the pattern analyzer 205 or the monitor CPU 22. Then the pattern analyzer 205 or monitor CPU 22 verifies whether the pattern data is valid by comparing the checksum included in the pattern data with a newly determined checksum. If it is found to be invalid, the pattern analyzer 205 or monitor CPU 22 disregards the determined position values. Otherwise, it calculates the position values of a video control area (i.e., a target area) with respect to $P_o$" as shown in FIG. 7 by using the following equations:

WIN_V_START=V_OFFSET+V_START,

WIN_V_END=V_OFFSET+V_END,

WIN_H_START=RCV_H_START,

WIN_H_END=RCV_H_END, and

V_BLANKPOS=V_OFFSET.

FIG. 7 illustrates graphical representation of the position values of a video control area, which are calculated based on the above equations. As shown, WIN_V_START and WIN_V_END represent the vertical positions of the upper and lower edges of the control area with respect to $P_o$", and WIN_H_START and WIN_H_END represent the horizontal positions of the left and right edges of the control area with respect to the same reference point. In addition, V_BLANKPOS represents the vertical position of a video line of the complete image that can be optionally blanked out. By blanking out the video line of the complete image that includes the topmost video line of the active image shown in FIG. 7, the user may not be disturbed from viewing the line pattern on a monitor screen.

When the video control area is fully identified by determining all the necessary position values of the control area, the gain controller 206 sets the gains for the identified control area according to a prescribed set of video parameter values included in the control code. Finally, the video preamplifier 207 amplifies the RGB signal accordingly.

Alternatively, WIN_H_START and WIN_H_END may be determined by using the following questions:

WIN_H_START=RCV_H_START+HDELAY1, and

WIN_H_END=RCV_H_END+HDELAY2, where HDELAY1 and HDELAY 2 represent additional adjustments for compensating the delays that occurs between an input and an output of the gain controller 206 when amplifying the gains of the identified user-selected area.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display system for adjusting video parameters of a user-selected area of a complete image being displayed, the display system comprising:

a level detector receiving a video signal from an image source device and detecting a line pattern signal integrated in one of a plurality of image lines representative of said complete image, said line pattern signal including pattern data identifying the user-selected area, said line pattern signal including PCLOCK, PDATA and PWINDOW signals, wherein the PDATA signal represents the vertical extent of the user-selected area and the PWINDOW signal represents the horizontal extent of the user-selected area, and wherein the line pattern signal includes a control code configured to control brightness of the user-selected area, and at least one of contrast, sharpness, and emphasis;

a pattern receiver coupled to said level detector for receiving said detected line pattern signal, said pattern receiver extracting said pattern data that includes a position indicator having ends that are vertically aligned with vertical edges of said user-selected area;

a pixel counter coupled to said pattern receiver for measuring a first set of horizontal positions of said position indicator ends with respect to a first starting pixel of a topmost image line of said complete image as a reference point;

a pattern analyzer calculating a second set of horizontal positions of vertical edges of a video control area with respect to said reference point on the basis of said first set of horizontal positions; and a video preamplifier adjusting at least one of video parameters of said video control area, wherein the display system further receives a V-sync and H-sync signal separate from the plurality of image lines.

2. The display system of claim 1, wherein said video parameters are brightness, contrast, and sharpness parameters.

3. The display system of claim 1, wherein said second set of horizontal positions are equivalent to said first set of horizontal positions.

4. The display system of claim 1, wherein said video preamplifier adjusts said at least one of video parameters in accordance with a prescribed set of video parameter values further included in said received pattern.

5. The display system of claim 1, wherein said pattern analyzer verifies said pattern by checking a checksum further included in said pattern data.

6. The display system of claim 5, wherein said pattern analyzer calculates said second set of horizontal positions only if said pattern data is verified.

7. The display system of claim 1, wherein said first set of horizontal positions are measured by counting each pixel located between a second starting point of said pattern-included image line and said indicator ends, respectively, said first and second starting points being vertically aligned.

8. The display system of claim 1, wherein said pattern data further includes a first set of vertical positions of horizontal edges of said user-selected area with respect to said pattern-included line.

9. The display system of claim 8, further comprising a line counter coupled to said pattern receiver for measuring a vertical offset distance between said reference point and said pattern-included line.

10. The display system of claim 9, wherein, said pattern analyzer further calculates a second set of vertical positions of horizontal edges of said control area with respect to said reference point by adding said offset distance to said first set of vertical positions, respectively.

11. A display system for adjusting video parameters of a user-selected area of a complete image being displayed, the system comprising:
- a level detector receiving a video signal from an image source device and detecting a line pattern signal integrated in one of a plurality of image lines representative of said complete image, said line pattern signal including pattern data identifying the user selected area, said line pattern signal including PCLOCK, PDATA and PWINDOW signals, wherein the PDATA signal represents the vertical extent of the user-selected area and the PWINDOW signal represents the horizontal extent of the user-selected area, and wherein the line pattern signal includes a control code configured to control brightness of the user-selected area, and at least one of contrast, sharpness, and emphasis;
- a pattern receiver coupled to said level detector for receiving said detected line pattern signal, said pattern receiver extracting said pattern data that includes a position indicator having ends that are vertically aligned with vertical edges of said area;
- a pixel counter coupled to said pattern receiver for measuring a first set of horizontal positions of said position indicator ends with respect to a first starting pixel of a topmost image line of said complete image as a reference point;
- a monitor microprocessor coupled to said pattern receiver for calculating a second set of horizontal positions of vertical edges of a video control area with respect to said reference point on the basis of said first set of horizontal positions, said microprocessor inputting pixel frequency information to said pixel counter; and
- a video preamplifier adjusting at least one of video parameters of said video control area,
- wherein the display system further receives a V-sync and H-sync signal separate from the plurality of image lines.

12. The display system of claim 11, wherein said video parameters are brightness, contrast, emphasis and sharpness parameters.

13. The display system of claim 11, wherein said second set of horizontal positions are equivalent to said first set of horizontal positions.

14. The display system of claim 11, wherein said video preamplifier adjusts said at least one of video parameters in accordance with a prescribed set of video parameter values further included in said received pattern.

15. The display system of claim 11, wherein said monitor microprocessor verifies said pattern data by checking a checksum further included in said pattern data.

16. The display system of claim 15, wherein said monitor microprocessor calculates said second set of horizontal positions only if said pattern data is verified.

17. The display system of claim 11, wherein said first set of horizontal positions are measured by counting each pixel located between a second starting point of said pattern-included image line and said indicator ends, respectively, said first and second starting points being vertically aligned.

18. The display system of claim 11, wherein said pattern data further includes a first set of vertical positions of horizontal edges of said user-selected area with respect to said pattern-included line.

19. The display system of claim 18, further comprising a line counter coupled to said pattern receiver for measuring a vertical offset distance between said reference point and said pattern-included line.

20. The display system of claim 19, wherein said monitor microprocessor further calculates a second set of vertical positions of horizontal edges of said control area with respect to said reference point by adding said offset distance to said first set of vertical positions, respectively.

21. A display system for adjusting video parameters of a user-selected area of a complete image being displayed, the display system comprising:
- a level detector receiving a video signal from an image source device and detecting a line pattern signal integrated in a topmost image line of an active image within said complete image of said video signal, said line pattern signal including PCLOCK, PDATA and PWINDOW signal, wherein the PDATA signal represents the vertical extent of the user-selected area and the PWINDOW signal represents the horizontal extent of the user-selected area, and wherein the line pattern signal includes a control code configured to control brightness of the user-selected area, and at least one of contrast, sharpness, and emphasis;
- a pattern receiver coupled to said level detector for receiving said detected line pattern signal, said pattern receiver extracting said PDATA signal that includes a position indicator having ends that are vertically aligned with vertical edges of said user-selected area, said pattern data further including a first set of vertical positions of horizontal edges of said user-selected area with respect to said topmost image line of said active image containing said line pattern signal;
- a pixel counter coupled to said pattern receiver for measuring a first set of horizontal positions of said position indicator ends with respect to a first starting pixel of a topmost image line of said complete image as a reference point, said pixel counter counting pixels using pixel frequency information;
- a line counter coupled to said pattern receiver for measuring a vertical offset distance between said reference point and said topmost image line of said active image;
- a pattern analyzer calculating a second set of horizontal positions of vertical edges of a video control area with respect to said reference point on the basis of said first set of horizontal positions, said video control area being defined with respect to said complete image, and said pattern analyzer further calculating a second set of vertical positions of horizontal edges of said control area with respect to said reference point by adding said offset distance to said first set of vertical positions, respectively; and
- a video preamplifier adjusting at least one of the video parameters of said video control area,
- wherein the display system further receives a V-sync and H-sync signal separate from the plurality of image lines.

* * * * *